United States Patent Office 3,442,167
Patented May 6, 1969

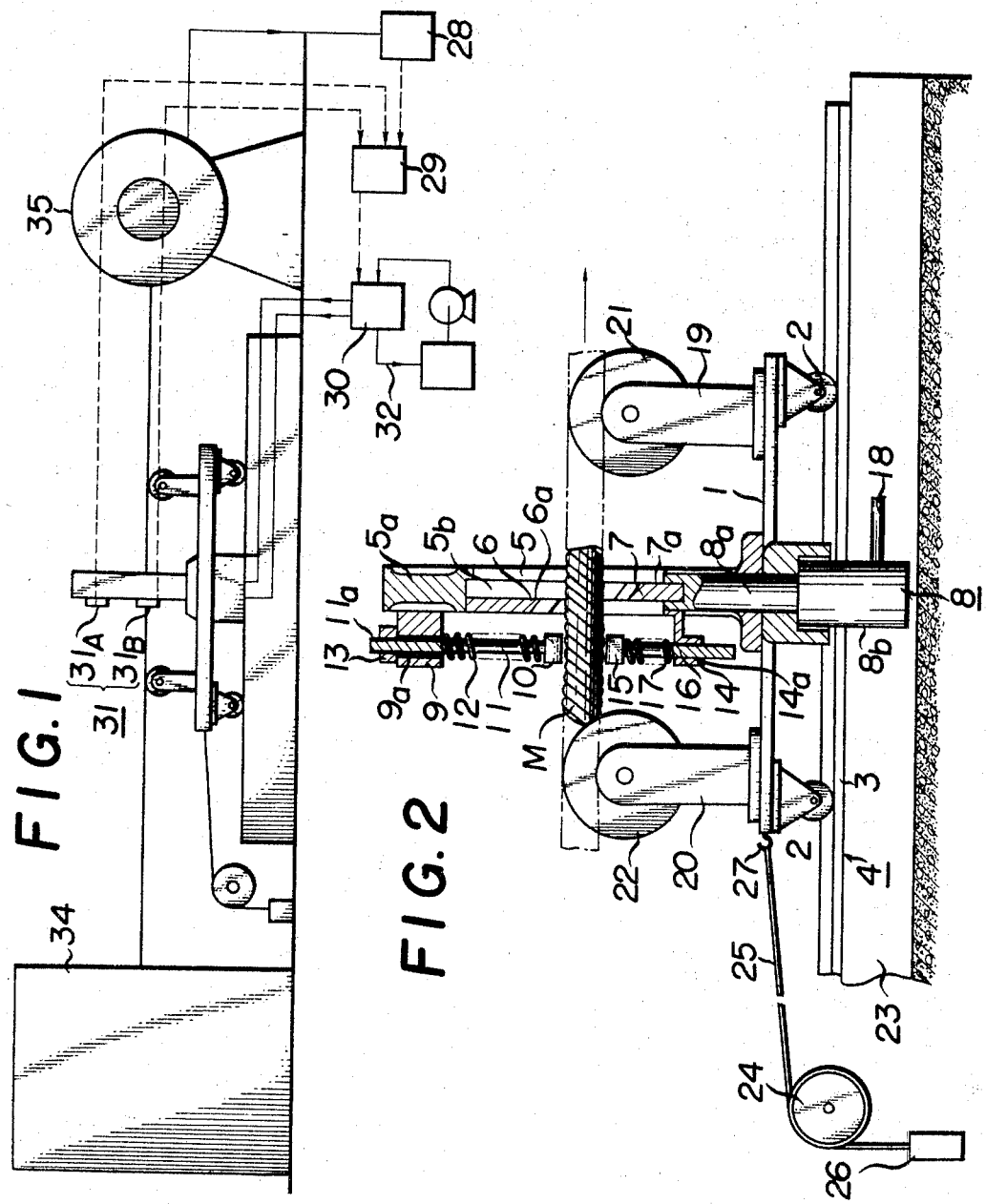

3,442,167
TRAVELLING SHEAR
Atsushi Ohmasu, 7020 Sannoya, Isogomachi,
Isogo-ku, Yokohama-shi, Japan
Filed May 13, 1966, Ser. No. 549,995
Int. Cl. B23d 25/02, 25/04; B26d 1/56
U.S. Cl. 83—308                                    4 Claims

ABSTRACT OF THE DISCLOSURE

A table or carriage on rollers moves longitudinally on guide rails along the path of movement of a cable to be cut. Two longitudinal speed rollers on standards on the top of the carriage support the cable in its path. A pair of shearing cutter blades are carried on a vertical frame on the table, between the two top rollers, and are disposed for vertical reciprocating movement on opposite sides of a cable. A pair of vertically reciprocable holder clamps are supported on and movable with the frame and are disposed slightly behind the cutters to hold the forward end of the remaining feed cable after the measured piece to be cut has been severed, the clamps and the cutter blades moving jointly.

---

The present invention relates to a travelling shear which is particularly suitable for the shearing of elongated, flexible products such as cables, wires, and the like.

Elongated products such as cables or wires which are flexible have the tendency to damage the cutting edge of travelling shears, when shearing, unless the travelling shear is synchronized with the travelling speed of the elongated products; otherwise, correct shearing cannot be guaranteed. For this reason, shearing has conventionally been carried out after stopping the travel of the elongated materials and then supporting them with a suitable mechanism at the nearest point to the one where the shearing should be done. A complicated mechanism is required to synchronize the operation time of the holding mechanism with the stopping of the travelling material and the action of the cutting edge. Such conventional apparatus further cannot be used with continuously movable material, for instance, where elongated material has undergone a process of vinyl coating. The cutting length of the material must be optionally adjustable over a wide range in accordance with the requests of the users, and the diameter of round material to be cut must also fit various standards. In order to use the travelling cutter in combination with the equipment necessary for the related continuous processes, it is desirable to so arrange the apparatus that the possible variation of the travelling speed of the material to be cut would not affect the cutting operation.

The primary object of the present invention is to provide a travelling shear in which flexible elongated materials such as cables, wires or the like can be cut with accuracy while the materials are in motion.

Subject matter of the invention

The travelling shear comprises a guide means carrying a shear carriage movable in the travelling direction of the flexible elongated material, a pair of opposed cutter edges so arranged that the elongated material is placed therebetween, and a pair of opposed holders or clamps with the elongated material placed therebetween. The holders are arranged in front of said cutter edges and elastically supported on the carriage. The cutting edges are moved in the cutting direction and the movable carriage for said holders is moved in the direction of travel of the material.

Thus, the material to be cut may run between a pair of cutter edges and a pair of holders, and at an appropriate time the movable carriage is actuated to move in the travelling direction to hold the travelling material between the two holders or clamps. This operation will permit the shear carriage to follow the travelling material along the guide means and during this motion the movable cutter edges are actuated to move in the cutting direction thereby to complete the cutting. Then the movable cutter edge and the movable carriage are moved in the reverse direction, leaving the travelling material free. The shear carriage will be left on the guide means, with only the travelling material continuing its running motion. The cutter carriage is also returned to its original position by a suitable means so as to be prepared for the next operation.

Thus the travelling elongated material is held by the holders while in motion when the cutting is effected, so that the perfect cut results. A change of the travelling speed does not affect the complete synchronization of the travel of the cutter edges with the traveling elongated material.

The distance between the holder means or clamps in rest condition is adjustable to accommodate variations in the sizes of the material to be cut.

The operating time of the clamping operation is selectable, so that the material can be cut to any desired length.

A quick-return mechanism returns the cutter frame to its original position, so that the time intervals between cuttings can be shortened.

The travelling shear of the present invention will be described in more detail hereinafter with reference to an embodiment illustrated in the accompanying drawings.

FIG. 1 is a schematic side elevational view of the travelling shear;

FIG. 2 is a sectioinal side view showing the principal part of said travelling shear;

Figure 4A:
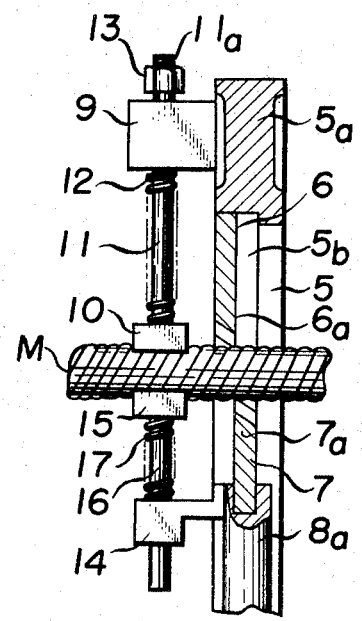
Figure 4B:
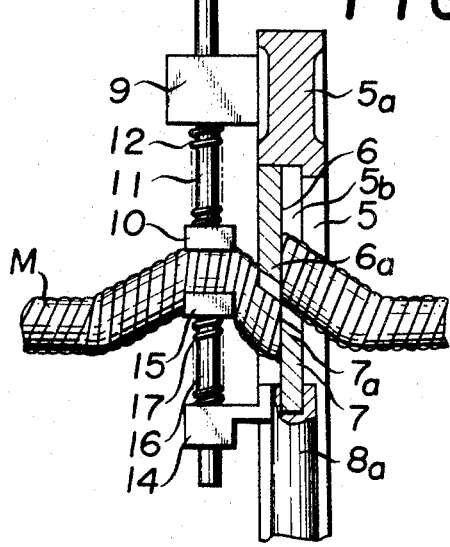
Figure 4C:
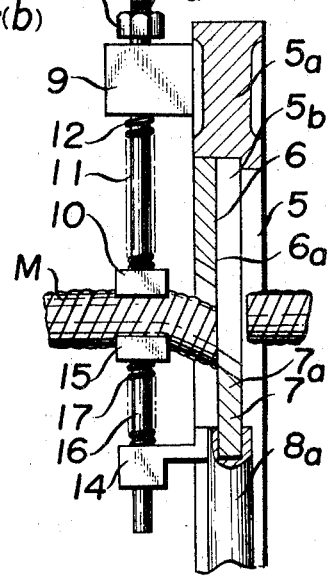

FIGS. 4(a), 4(b) and 4(c) are respectively the sectional side views illustrating the process of the shearing operation.

Figure 3:
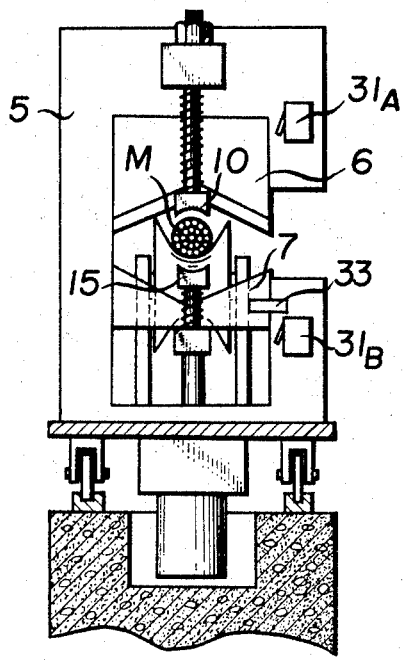
FIG. 3 is a sectional view taken along line III—III of FIG. 2.

The travelling shear is provided with a guide means 4 comprising the rails 3 extending in the travelling direction of the elongated material M. A shear carriage 1 provided with the wheels 2, is supported on rails 3. It will be seen that said shear carriage 1 is equipped, in its center, with a gate-type pedestal 5 to support the cutter mechanism. A fixed cutter edge 6 is suspended, with its edge faced downward, on a cross beam 5a of the pedestal 5. The cutter edge holding pedestal 5 has an opening on one side (see FIG. 3) through which the material can be inserted, or removed. The fixed cutter edge 6 has its blade section V-shaped and, with movable cutter edge 7 arranged opposed thereto, forms a cutting pair, with the travelling material M placed therebetween. Cutting edge face 7a slides against the cutting edge face 6a. Movable cutter edge 7 is also V-shaped, to oppose the fixed cutter edges 6, with both sides thereof being mounted vertically slidably in a guide groove 5b formed on the holding pedestal 5.

The lower end of movable cutter edge 7 is coupled to a piston rod 8a of the piston cylinder 8. Piston rod 8a extends through the carriage 1 to be received in a cylinder 8b provided at the lower part of the cutter carriage 1.

In front of the cutting point of the travelling material, a supporting arm 9 is mounted on beam 5a. Supporting arm 9 is provided with a guide hole 9a which is directed towards the travelling elongated material M. A supporting rod 11 having a holding member 10 at its end is movably fitted in hole 9a. The holding member 10 has an arc-shaped end face and is arranged to be directed toward the travelling elongated material M. A compression spring 12, wound around said supporting rod 11 is located between holding member 10 and the supporting arm 9. The top end of the supporting rod 11 is threaded, see 11a, and projects through the guide hole 9a above the supporting arm, with an adjusting nut 13 threadedly fitted to the thread. A supporting arm 14, located opposite to the supporting arm 9 is secured to the piston rod 8a. Supporting arm 14 is formed with a guide hole 14a facing toward the side of the travelling material M. A supporting rod 16 having a movable holding member 15 at its end is movably fitted in hole 14a. Holding member 15 forms, with said holding member 10, a holding or clamping pair. Member 15 has an arc-shaped face opposed to the travelling material M. A compression spring 17, wound around the supporting rod 16 is located between holding member 15 and the supporting arm 14. The compression spring 12, over rod 11, is initially set in a free floating condition and is then adjusted to be pre-stressed by the adjusting nut 13.

Said piston cylinder 8 is connected to an oil pressure source, through a flexible high-pressure rubber hose 18, and serves as an operating means for the movable cutter 7 while concurrently serving as the movement generating means for the movable holding member 15.

The cutter edge clearance between said cutter edges 6 and 7 is arranged to be larger than the diameter of the travelling elongated material to be cut, and that the holding member 15 is sufficiently separated from the travelling material to stay free from contact with the material. It is preferred to arrange the holding members 10 and 15 closer to the travelling material than the deepest edge points of the cutting edges 6a, 7a. In this case, the movable holding member 15, which is forced upward by the piston cylinder mechanism 8, first contacts the material and holds it clamped to the fixed holding member 10; thereafter the movable cutter 7 approaches the fixed cutter 6 to effect the cutting. The travelling material is supported on supports 19 and 20, specifically on wheels 21 and 22 having semi-circular grooves 21A, 22A formed on their respective peripheries, and are located ahead and behind pedestal 5 to support the travelling material to be cut.

The mechanism for returning the cutter carriage 1 to the original position is extremely simple in structure. The rail supporting base 23 holds, at its rear, a pulley 24 over which a rope 25 runs, coupled to a hook 27 (provided at the rear of the carriage 1) at one end, and fitted with a weight 26 at the other.

In order to electrically control the piston cylinder means 8, the apparatus of the present invention is provided with a meter 28, a pulse generator 29 which transmits pulses upon receiving the measured values provided by said meter 28, a change-over valve mechanism 30 which effects "on" and "off" operations for supplying oil pressure from the oil pressure source to the piston cylinder means 8 in accordance with the pulse signals given by said pulse generator, and a limit switch mechanism 31 which senses the completion of the cutting operation and signals it to the plate generator 29. The change-over valve mechanism 30 closes a by-pass 32 when oil pressure is to be supplied to the piston cylinder 8, to change the direction of oil pressure when the piston rod 8A is operated reversely, and to open the by-pass 32 when no oil pressure is to be supplied to the piston cylinder 8. The limit switch mechanism 31 comprises two limit switches 31A and 31B (FIG. 3) which are located respectively up and down near the cutter edge on the cutter edge holding pedestal 5. The upper limit switch 31A transmits the signal to the pulse generator 29 for reversing the operation of the piston rod 8A when the movable cutter 7 reaches the upper limit thereby to actuate the valve mechanism 30, while the lower limit switch 31B transmits to the pulse generator 29 a signal for stopping the oil supply to the piston cylinder mechanism 8 when the movable cutter edge 7 reaches the lower limit. Arm 33 located on the movable cutter 7 operates the limit switches.

A wire extruding machine 34 supplies wire to the rear of base 23. At the front thereof, a take-up mechanism 35 is provided, arranged as to permit replacement of the take-up reels. The take-up reels are so placed that one of them is always available to receive travelling material.

The take-up mechanism 35 and the wire extruding machine 34 are operated so that the travelling material, such as wire or cable, is forced to run through the cutter mechanism by the tractive force of the take-up mechanism 35 and the pushing force of the extruding machine 34. When the take-up mechanism 35 completes a predetermined number of rotations, the meter 28, reading the wire length on the take-up reels, transmits a signal to the pulse generator 29. On receiving the signal from the pulse generator 29, the change-over valve mechanism 30 is actuated to close the by-pass 32, supply oil pressure to the piston cylinder 8 to raise the piston rod 8A. As piston rod 8A rises, the holding members 10 and 15 grip the travelling material with the help of the compressive force of the compression springs 12 and 17 (FIG. 4a). The cutter carriage 1 will run on the rails 3, driven by the travelling material at the same speed as the material, while simultaneously pulling up the weight 26 on rope 25. During this travel, the piston rod 8A raises further and the travelling material is cut by the cutters 6 and 7 (FIG. 4b) when the cutter 7 reaches the upper limit, arm 33 actuates limit switch 31A. Change-over valve mechanism 30 is actuated through the pulse generator 29 to reverse operation of the piston rod 8A. The reverse motion of the piston rod 8A allows the cutter edges 6 and 7 to separate from each other (FIG. 4c). Holding members 10 and 15 also separate from the travelling elongated material M. Material M continues to advance by the pushing force of the extruding machine, although the cutter carriage 1 is pulled back by the weight 26 and is stopped when the weight reaches the floor surface.

When the piston rod 8A returns to the lower limit, the limit switch 31B is operated and the oil supply to the piston cylinder mechanism 8 is stopped, thus releasing the pump pressure through the by-pass 32. By repeating the above operations, the cutting operation is effected steadily and with accuracy without stopping the travelling of the material. The present invention is particularly useful when cable is passed through a vinyl tank before the cutting process to coat the cable with a vinyl film.

In the embodiment described above, weight 26 is utilized as the mechanism for pulling back the cutter body; other suitable means may also be used. The holding of the travelling material by the holding members need not be effected before the cutter edges contact the travelling material, but also when the cutting edges make contact. The operations of the cutting edges and the holding members may be by the same piston cylinder mechanism, but other separately provided suitable mechanisms may also be used. The upper limit switch in the limit switch mechanism may be replaced by a mechanism which provides the signal for returning the cutter edges and the holding members to their respective positions at the same time with the completion of the cutting. Also, by suitably arranging the setting of the meter it is possible to give the signal to the operating mechanism of the holding members and the cutting edges at any desired operating period.

Changes and modifications in the details of the travelling shear may be made without departing from the spirit and scope of the invention as defined by the following claims.

What is claimed is:
1. A shear to cut moving, elongated flexible materials comprising:
  a guide means having rails extending along the direction of movement of the elongated flexible material;
  a carriage movable along the rails;
  support means on said carriage for supporting said flexible material before and after said material is cut;
  a pair of vertically opposed clamp member means movably secured on the carriage adjacent said support means and engageable with the material after said material passes said support means, said carriage being transported along the rails at the same speed as the elongated material when said clamp members are engaged with said material;

oppositely relatively movable shear cutters disposed on the carriage and located adjacent the clamp members;

operating means for jointly and concurrently moving said clamp means and said shear cutters to clamping and cutting positions, respectively, and for releasing said cutters from said cutting position before releasing said clamp means from engagement with said material;

and power means actuating said operating means.

2. Shear according to claim 1 wherein said clamp means and said cutters are mechanically joined together and relatively located offset with respect to each other for staggered engagement, said clamp means engaging said elongated, flexible material in advance of the engagement of said cutters, so that, upon actuation of said operating means, said clamp means will clamp said material in advance of the cutters reaching the cutting position.

3. Shear according to claim 1 further comprising means sensing the position of said cutters for controlling said power means to reverse said operating means when said cutters have completely travelled to the cutting position, to thereby cause said cutting and clamping means to be released from said material.

4. Shear according to claim 1 including a structural link interconnecting said shear cutters and said clamp means; and a resilient lost motion interconnection between said link and said clamp means to permit continued movement of said cutters to the cutting position after the clamps have reached the clamping position.

References Cited

UNITED STATES PATENTS

| | | | |
|---|---|---|---|
| 1,800,005 | 4/1931 | Braun | 83—308 X |
| 2,287,833 | 6/1942 | Ridgway | 83—294 X |
| 2,288,988 | 7/1942 | Blount et al. | 83—308 X |
| 2,325,431 | 7/1943 | Shippy | 83—319 X |
| 2,630,177 | 3/1953 | Dellinger | 83—308 |
| 2,737,703 | 3/1956 | Van Clief | 83—308 X |
| 3,161,363 | 12/1964 | Press | 242—56 |
| 2,612,951 | 10/1952 | Palmleaf | 83—639 X |
| 3,178,974 | 4/1965 | Roess | 83—318 X |

FOREIGN PATENTS

| | | |
|---|---|---|
| 868,053 | 5/1961 | Great Britain. |

JAMES M. MEISTER, *Primary Examiner.*

U.S. Cl. X.R.

72—254, 257; 83—319